(12) United States Patent
Machida et al.

(10) Patent No.: US 6,657,612 B2
(45) Date of Patent: Dec. 2, 2003

(54) IMAGE DISPLAY MEDIUM DRIVING METHOD AND IMAGE DISPLAY DEVICE

(75) Inventors: Yoshinori Machida, Nakai-machi (JP); Kiyoshi Shigehiro, Nakai-machi (JP); Yoshiro Yamaguchi, Nakai-machi (JP); Motohiko Sakamaki, Nakai-machi (JP); Takeshi Matsunaga, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 264 days.

(21) Appl. No.: 09/956,026

(22) Filed: Sep. 20, 2001

(65) Prior Publication Data

US 2002/0033793 A1 Mar. 21, 2002

(30) Foreign Application Priority Data

Sep. 21, 2000 (JP) ........................................ 2000-287785

(51) Int. Cl.$^7$ ................................................ G09G 3/34
(52) U.S. Cl. ........................................ 345/107; 359/296
(58) Field of Search ........................ 345/107; 359/296; 204/450, 600; 349/86–92; 427/213.3; 430/32, 38

(56) References Cited

U.S. PATENT DOCUMENTS 4,093,534 A * 6/1978 Carter et al. ................ 350/355
5,956,113 A * 9/1999 Crawford .................... 349/185
6,369,792 B1 * 4/2002 Kikinis ........................ 345/107

OTHER PUBLICATIONS

Jo et al., "New Toner Display Device (I)", Japan Hardcopy L99, pp. 249–252.

Jo et al., "New Toner Display Device (II)", Japan Hardcopy L99 Fall, pp. 10–13.

* cited by examiner

Primary Examiner—Lun-Yi Lao
(74) Attorney, Agent, or Firm—Oliff & Berridge, PLC

(57) ABSTRACT

An image display device and driving method thereof produce a multiple color display without inviting a drop in resolution, or with the drop in resolution suppressed. Between a back substrate and a transparent display substrate forming the image display surface, the image display part has in order a display electrode on which a transparent surface coating is formed, a spacer, and a back electrode on which a surface coating is formed. A voltage control part applies a −350 V dc voltage, for example, to the display electrode to display black by black particles, applies an approximately +350 dc voltage to the display electrode to display white by white particles, and applies, for example, a +/−500 V particle drive voltage pulse repeatedly to the display electrode to make the black and white particles clump together inside the unit cell, thereby making the unit cell transparent to produce a transparent display.

14 Claims, 13 Drawing Sheets

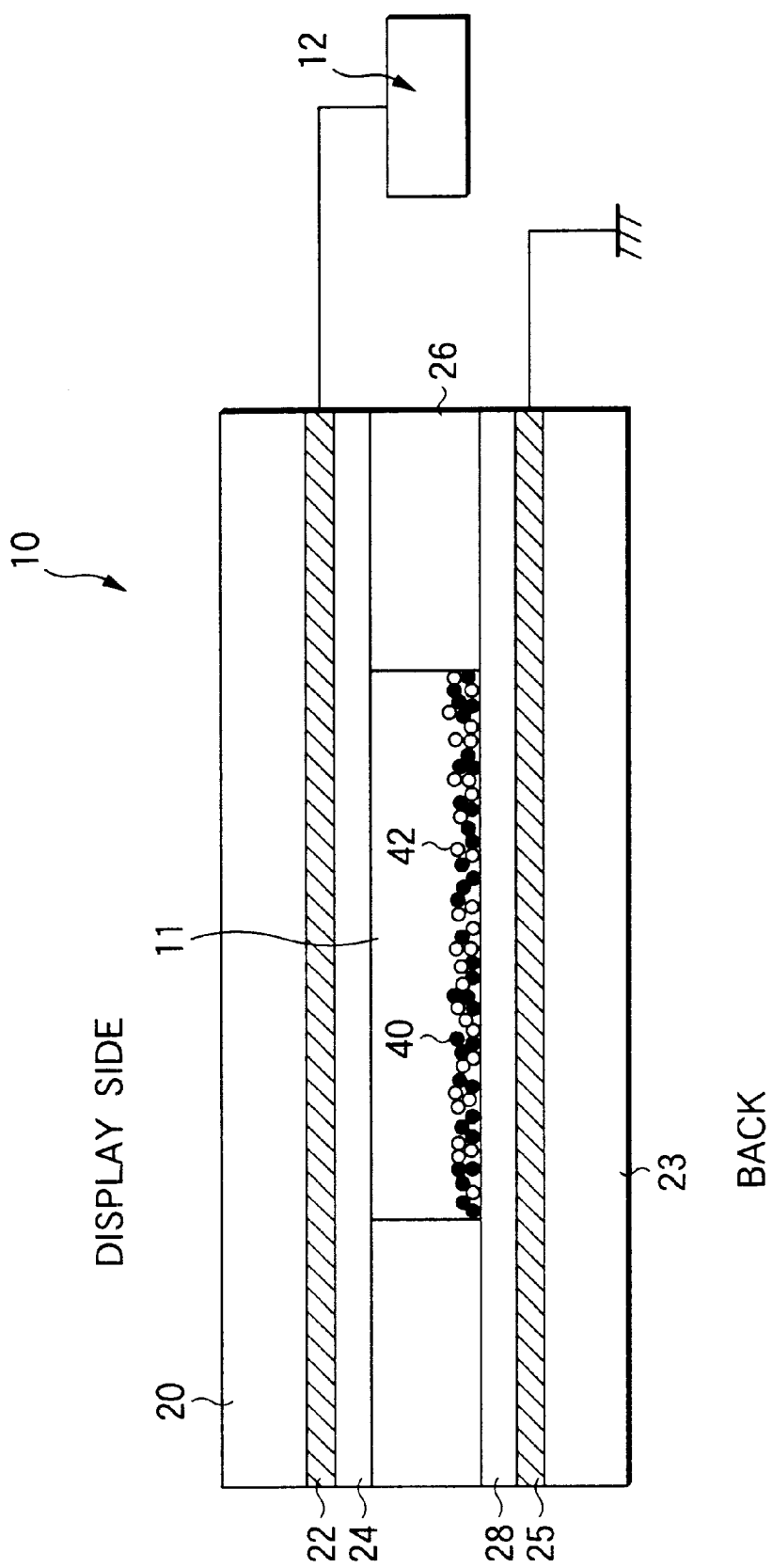

BRIGHT MAGENTA    MAGENTA    DARK MAGENTA

IMAGE DISPLAY MEDIUM DRIVING METHOD AND IMAGE DISPLAY DEVICE

BACKGROUND OF THE INVENTION

1. Field of the Invention

The present invention relates generally to a driving method for an image display medium and to an image display device, and relates more specifically to a driving method and to an image display device for an image display medium having unit cells disposed between plural substrates and at least two types of particles of different charge characteristics and color sealed inside the unit cells.

2. Description of Related Art

Twisting ball displays (dichroic twisting ball displays), electrophoretic image displays, magnetophoretic image displays, thermal rewritable image displays, and liquid crystals with memory have been proposed as display media capable of repeating image display.

Thermal rewritable display media and liquid crystals with memory stand out amongst these rewritable display media because of their excellent image memory characteristics.

Electrophoretic and magnetophoretic display media apply an electrical or magnetic field to disperse movable colored particles in a white fluid medium, and form images from the color of the colored particles and the color of the white medium. Images are formed, for example, by making the color particles adhere to the display surface in the image area to display the color of the color particles while removing the color particles from the display surface in the non-image areas to display the white of the white fluid. Furthermore, these types of displays have memory because the color particles do not move unless an electrical or magnetic field is applied.

Twisting ball displays produce an image by applying an electric field to spheric particles (balls), half of each ball being white and the other half black, to selectively reverse ball orientation. For example, the balls are driven to produce the black side to the surface of the display in the image areas, and produce the white side to the display surface in the non-image areas.

This type of display can also store an image because the balls do not change orientation unless a field is applied. This type of display medium can also be manufactured in sheets relatively easily because the inside of the display medium contains substantially solid particles, although oil is present only in the cavities around the particles.

A common problem of thermal rewritable display media and liquid crystals having memory is that a truly paper white display cannot be achieved. This means that contrast between image and non-image areas is not sufficient, and it is therefore difficult to achieve a sharp image display.

Furthermore, while the white fluid medium used in electrophoretic and magnetophoretic display media makes it possible to produce a clear white display like a paper, intrusion of the white fluid between color particles when displaying the color of the color particles causes a drop in display density. Contrast between the image and non-image areas is thus low, and it is difficult to achieve a sharp image display.

If the display medium is removed from the image display device and handled roughly like paper, there is the possibility of the white fluid sealed inside the display medium leaking.

Even when a twisting ball display is driven to produce the white spheric side of every particle to the display surface, it is not possible in principle to produce a 100% white display because ambient light rays penetrating the gaps between the balls are not reflected and are lost inside the display medium. In addition, light absorption and diffusion by the cavities mean that only a gray tinged white display can be achieved. It is also difficult to completely reverse the particles, leading to a drop in contrast and, as a result, making it difficult to produce a sharp image. Moreover, because particle size must be smaller than the pixel size, minute particles coated different colors must be manufactured in order to achieve a high resolution display. This requires sophisticated manufacturing technology.

A number of display media using toner (particles) have been proposed as a novel display medium resolving the above problems (see Japan Hardcopy L99, pp. 249–252; and Japan Hardcopy L99 fall (scheduled publication), pp. 10–13).

These display media have a transparent display substrate and a facing back substrate with a small gap therebetween, and two types of particles (toner) with different color and charge characteristics sealed in this substrate gap. When a field is applied between these substrates according to the image information, the desired color particles are made to adhere to the display substrate to form and produce an image display.

This type of particle display medium using toner also has memory because the toner does not move unless a field is applied. Such display media are also free from leakage problems because the image display medium contains nothing but solids. Furthermore, a nearly 100% reversal between white and black is in principle possible, and high contrast, sharp images can be displayed. It is also possible to display high contrast two color (such as black and white) images by using high opacity particles. It should be noted that display media using toner are referred to below as simply an image display medium.

To display multiple colors on a conventional image display medium, it is necessary, as shown in FIG. 19, to form plural unit cells inside the display medium, seal a different color of particle into each unit cell, and group a number of adjacent unit cells in order to display one color.

As shown in FIG. 19, for example, three types of unit cells, respectively containing sealed therein white and magenta particles, white and yellow particles, and white and cyan particles, are disposed in regular sequential order, and three adjacent unit cells are driven as a unit to display a particular pixel color as shown in FIG. 20.

To achieve a full color image display using this type of display medium, the white particles in each of the unit cells are collected at the display surface side to display white as shown in FIG. 20. Black is displayed by collecting the color particles in each of the unit cells to the display surface side. Magenta, yellow, and cyan are displayed by collecting the color particles to the display surface side in each unit cell containing the corresponding color particles while displaying white in the other unit cells. Red, blue, and green are displayed by driving the color particles in each unit cell so that the color particles combine appropriately as shown in FIG. 20. Note that in FIG. 20 W indicates white, M magenta, C cyan, and Y yellow.

By using plural cells to represent one pixel, this driving method leads to a drop in resolution, which is particularly apparent as a drop in text quality. It is therefore necessary to use microcells with a small surface display area per unit cell in order to maintain the resolution of display. However, it is difficult to manufacture such microcells, and when production is successful, production efficiency is poor and a rise in production cost is unavoidable.

The load on the drive circuit driving the individual cells is also high because a large number of unit cells are formed in the same display area. A high capacity drive circuit is therefore needed. An increase in drive circuit cost is therefore also unavoidable.

A further problem with a display as shown in FIG. 19 and FIG. 20 is that there is a grayish tinge to the black display, and there is a resulting drop in display quality.

It will be noted that changing the color combinations of the enclosed color particles will not change the fundamental problems of degraded text quality due to a drop in resolution, and degraded display quality due to lower contrast between black and white.

Conventional image display media are also completely reflection display media. Viewability thus drops sharply at night and in the dark, making lighting necessary. The particles used in such image display media must be highly opaque, however, and backlighting such as used with liquid crystal displays cannot be used. Such image display media must therefore use front lighting, thus limiting the expressiveness and potential application of the display medium.

The present invention was conceived with consideration for the aforementioned problems, and provides for a driving method for an image display medium and an image display device that displays multiple colors without inviting a drop in resolution, or with a suppressed drop in resolution.

This invention also provides for a driving method for an image display medium and an image display device that can achieve a high quality multiple color display.

Yet further, this invention also provides for a driving method for an image display medium and an image display device that can use backlight drive.

SUMMARY OF THE INVENTION

The present invention has been made in view of the above circumstances and provides a driving method for an image display medium, the image display medium having plural facing substrates of which at least a display-side substrate is transparent, a unit cell delimited between the substrates, and at least two types of particle groups of different color and charge characteristics sealed inside the unit cells. The driving method has steps of: producing a color display by applying a particle drive voltage pulse of a saturation voltage, which is high enough to saturate the color density of the at least one particle group of the at least two particle group types that moves to the display-side substrate as a result of a field produced by applying voltage to a unit cell; and producing a transparent display by applying a particle drive voltage pulse of an absolute voltage greater than the saturation voltage so that the two particle group types inside the unit cells agglomerate and make the unit cell transparent.

The present invention further provides an image display device having: plural facing substrates of which at least a display-side substrate is transparent; a support member disposed between each of the plural substrates and delimiting a unit cell; particle groups of at least two types sealed in the unit cell, having different color and charge characteristics, and moving in mutually opposite directions between the substrates in response to an applied field; a pair of electrodes disposed between plural facing substrates to form a field in the unit cell; and a display control unit for controlling so as to display the color of at least one of the particle groups by applying a particle drive voltage pulse of a saturation voltage, which is high enough so that the color of the at least one particle group of the at least two particle groups that moves to the display-side substrate due to the applied field reaches a saturation density, and controlling so as to produce a transparent display by applying a particle drive voltage pulse of an absolute voltage greater than the saturation voltage so that the two particle group types inside the unit cells agglomerate and make the unit cell transparent.

While conducting repeated particle drive tests in an image display device that displays color at a transparent display substrate by moving one of two different types of particles sealed inside a unit cell to a transparent display-side substrate, the inventors discovered the following. That is, if the absolute value of the particle drive voltage is greater than the particle drive voltage at which color saturation is achieved (referred to below as the saturation voltage), the sealed particles agglomerate. The surface area occupied at the display surface by these particle clumps is extremely small. As a result the unit cells are apparently transparent, and the back side of the unit cells can be seen from the display surface.

Furthermore, the inventors also discovered the following through repeated experiments with agglomeration of the sealed particles. That is, if the frequency of the particle drive voltage pulse applied for agglomeration is higher than the frequency of the particle drive voltage pulse applied when displaying color using the color of the particle groups, the time required for the particle groups to agglomerate and the unit cell to become transparent is shortened.

Furthermore, if the frequency of the particle drive voltage pulse applied to dissociate the agglomerated particle groups and make the transparent unit cells no longer transparent is higher than the frequency of the particle drive voltage pulse applied to achieve a color display, the time required for the particle groups to dissociate and redisperse in the unit cell is shortened.

As a result of these findings, the present invention applies a particle drive voltage pulse at a repeat frequency higher than the repeat frequency of the particle drive voltage pulse at the saturation voltage to produce a transparent display. This makes it possible to change quickly from a color display to a transparent display.

Furthermore, to end the transparent display, the present invention applies a particle drive voltage pulse of a voltage lower than the voltage causing particle groups to agglomerate at a frequency higher than the repeat frequency of the particle drive voltage pulse at the saturation voltage. This makes it possible to change quickly from a transparent display to a color display.

Yet further, because the inside of a unit cell can be seen from the display side when the unit cell is made transparent, the present invention can be configured to display three colors using the particle colors and a back substrate color by making the back substrates a different color than the colors of the two particle types.

Furthermore, if the image display device has a laminated configuration with three or more substrates, and plural stacked unit cells disposed between substrates are driven as one display cell, a multiple color display can be produced using the substrate color and the colors of the particles sealed inside the plural unit cells.

Further alternatively, an image display device according to this invention has a light emitting unit for emitting light toward the display-side substrate. In this case all substrates are transparent and the light emitting unit is disposed behind the back substrate. Because light passes from unit cells set to a transparent state, a clear image display can be achieved even in dark surroundings, and a high contrast image display can be achieved.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 1 is a schematic view showing the configuration of an image display device according to a first embodiment of the present invention;

DESCRIPTION OF THE PREFERRED EMBODIMENTS

Embodiment 1

Figure 2A:
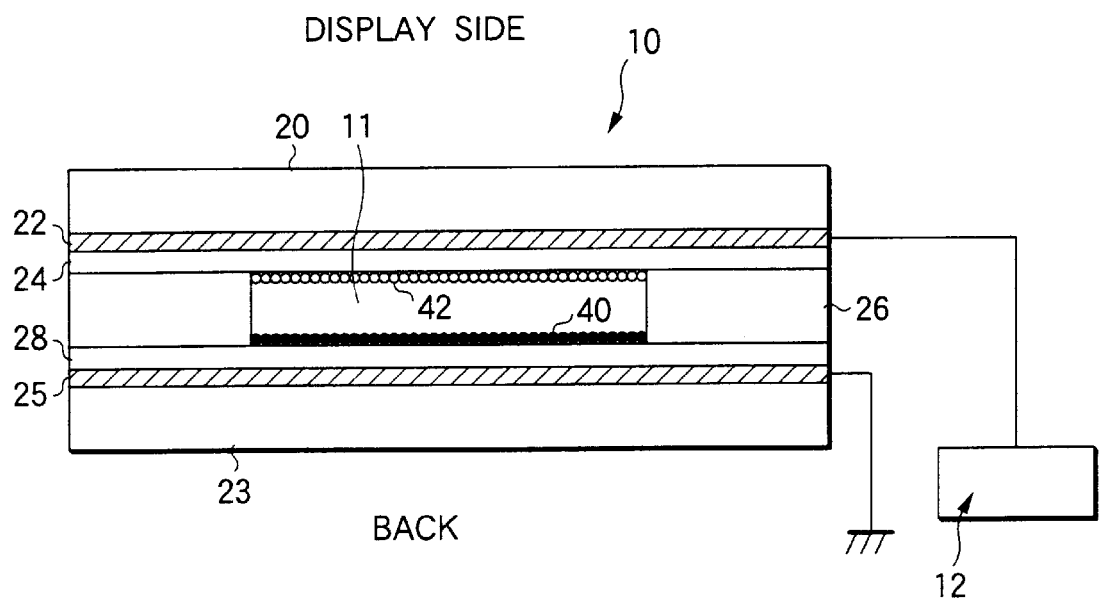
FIGS. 2A and 2B are section views showing the image display part when a +200 V positive dc voltage, for example, is applied equally to the display electrode 22, and a –200 V negative dc voltage, for example, is applied equally to the display electrode 22, respectively.

An image display device according to a first preferred embodiment of this invention comprises an image display part 10 and a voltage control part 12 as shown in FIG. 1.

Between a back substrate 23 and a transparent display substrate 20 forming the image display surface, the image display part 10 has in order a display electrode 22 on which a transparent surface coating 24 is formed, a spacer 26, and a back electrode 25 on which a surface coating 28 is formed.

It should be noted that the image display part 10 is equivalent to the image display medium of this invention, the display substrate 20 and back substrate 23 of the image display part 10 are equivalent to substrates of this invention, and voltage control part 12 is equivalent to a display control unit of this invention.

The display substrate 20 of a first embodiment of this invention is made using a 7059 glass substrate 50 mm×50 mm×1.1 mm (length×width×thickness) with transparent ITO electrodes, for example. The display electrodes 22 are formed from a transparent electrode material on the unit cell 11 surface side of the display substrate 20. The voltage control part 12 is connected to the display electrode 22.

Spacer 26 demarcates unit cell 11, which is formed in this example by a 20 mm×20 mm square space removed from the middle of a 50×50×0.3 mm silicon rubber sheet, for example. Color particles (black particles) 40 and white particles 42 are sealed inside the unit cell 11.

The back substrate 23 is a 50 mm×50 mm×3 mm epoxy (length×width×thickness) substrate. A grounded back electrode 25 is disposed to the unit cell 11 side of back substrate 23, and a 5 $\mu$m thick transparent polycarbonate surface coating 28 is then formed over the unit cell 11 surface of the back electrode 25.

The white particles 42 sealed inside unit cell 11 are spheric white particles of crosslinked polymethylmethacrylate containing titanium oxide (Techpolymer MBX-20-WHITE, Sekisui Plastics Co.) with a volume average diameter of 20 $\mu$m mixed with isopropyl trimethoxysilane-treated titania fine powder at 100:0.1 parts per weight. The color particles (black particles) 40 are spheric black particles of crosslinked polymethylmethacrylate containing carbon (Techpolymer MBX-20-BLACK, Sekisui Plastics Co.) with a volume average diameter of 20 $\mu$m mixed at 100:0.2 parts per weight with aminopropyltrimethoxysilane-treated Sirica fine powder (A130, Japan Aerosil Co.).

In a first preferred embodiment of this invention a particle mixture containing white particles 42 and black particles 40 mixed 2:1 parts by weight is filled to approximately 10% of the volume of each unit cell 11. It should be noted that in this embodiment the white particles 42 are negatively charged and the black particles 40 are positively charged.

The image display part 10 is formed in this embodiment by placing spacer 26 from which the unit cell areas have been removed on back substrate 23, to which back electrode 25 and surface coating 28 are formed. The above-described particle mixture is then screened and deposited into the unit cells 11 to approximately 10% of cell capacity. The display substrate 20, with the surface coating 24 and display electrode 22 formed thereon, is then placed with the surface coating 24 side thereof facing the unit cell 11 side of the spacer 26, and is clamped to the back substrate 23 with double clips, thereby forming image display part 10 having a silicon rubber sheet adhering to both substrates.

The back electrode 25 disposed to the back substrate 23 of the resulting image display part 10 is to ground, and the particles inside the unit cells 11 can be moved by the field generated by applying a voltage to the display electrode 22 of the display substrate 20. The voltage control part 12, which is connected to the display electrode 22, controls the applied voltage.

If the voltage control part 12 applies a positive dc voltage, +350 V for example, to the display electrode 22, the field produced inside a unit cell 11 causes the negatively charged white particles 42 adhering to the back substrate 23 to move to the display substrate 20 side, and the positively charged black particles 40 to be electrostatically pulled to the back substrate 23 as shown in FIG. 2A.

This produces an even distribution of white particles 42 to the display substrate 20 and achieves a good white display (e.g., with a reflection density $\leq 0.3$). Even if a small quantity of inversely charged black particles 40 is also present at the display substrate 20, the quantity of black particles 40 relative to white particles 42 is very small, and there is substantially no apparent effect on the displayed image.

Figure 2B:
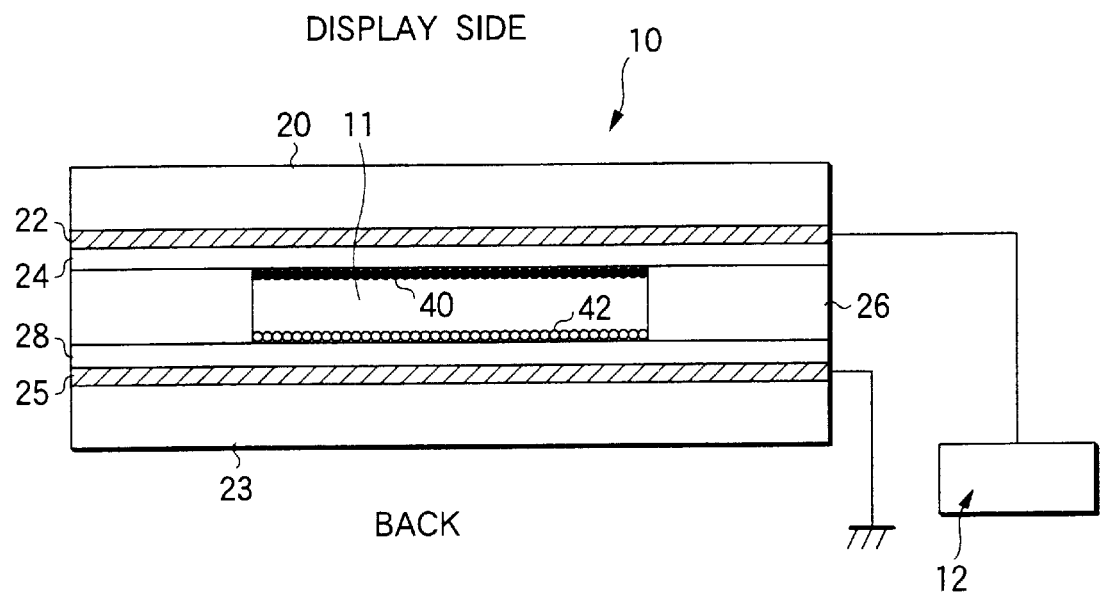

If the voltage control part 12 then applies a negative dc voltage of, for example, approximately −350 V to the display electrode 22, the field produced in the unit cells 11 causes the positively charged black particles 40 at the back substrate 23 side to move to the display substrate 20, and the negatively charged white particles 42 to be electrostatically pulled to the back substrate 23 side as shown in FIG. 2B.

This produces an even distribution of black particles 40 to the display substrate 20 and achieves a good black display (e.g., with a reflection density $\geq 1.6$). Even if a small quantity of inversely charged white particles 42 is also present at the display substrate 20, the quantity of white particles 42 relative to black particles 40 is very small, and there is substantially no apparent effect on the displayed image.

This first embodiment of the present invention can thus achieve a good white display, a high density black display, and can thus display sharp, high contrast images.

Figure 3:
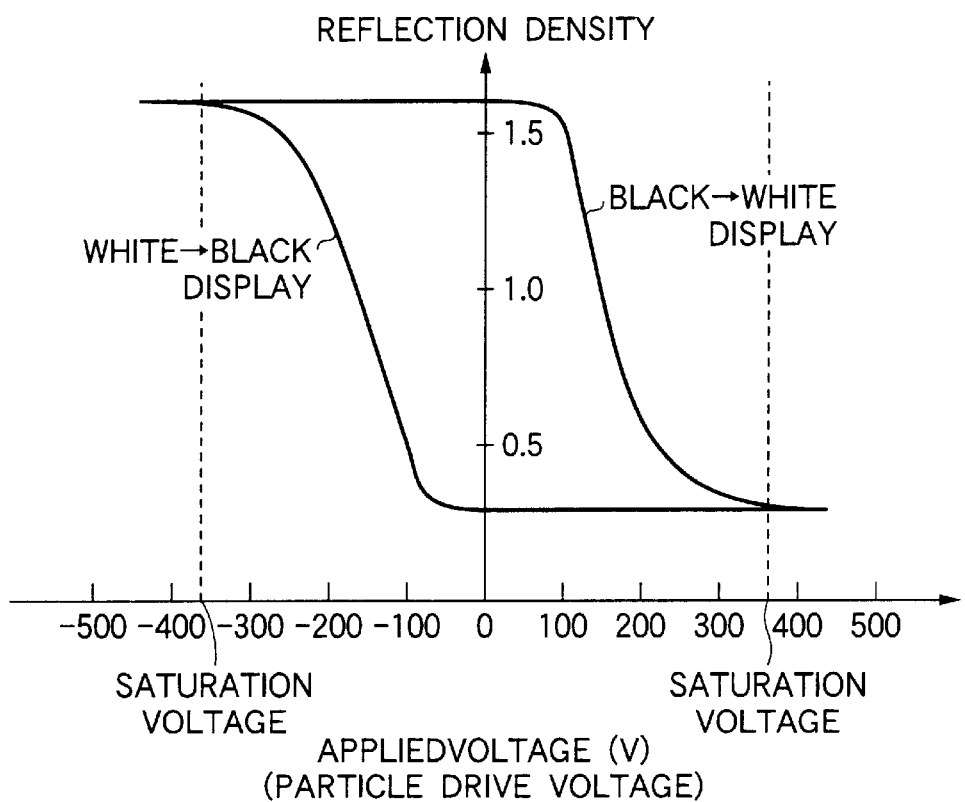
FIG. 3 shows the relationship between black particle reflection density, white particle reflection density, and the voltage applied to the image display part of the image display device shown in FIG. 1.
Figure 4:
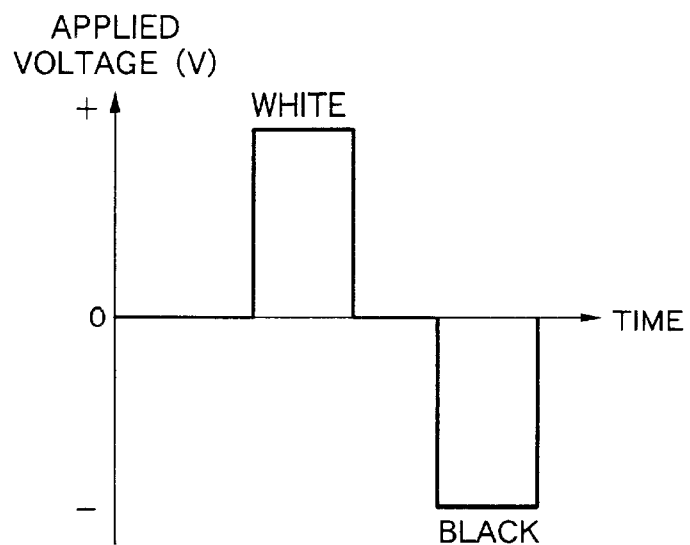
FIG. 4 shows the particle drive voltage pulse applied to the image display part.

The relationship between applied voltage and display density in this preferred embodiment of the invention is shown in FIG. 3 based on measuring the reflection density using an X-Rite 404 densitometer (X-Rite Co.). It should be noted that the particle drive voltage pulse used to move white particles 42 or black particles 40 inside the unit cells 11 is a simple rectangular wave pulse as shown in FIG. 4, and the pulse apply time is 20 msec.

As shown in FIG. 3, applying an approximately +350 V charge to the white particles 42 substantially saturates the white density, and applying a −350 V charge to the black particles 40 substantially saturates the black density. The driving method of this embodiment of the invention thus achieves higher display contrast than does the particle driving method of a conventional particle display medium while applying a voltage pulse near the voltage at which color density is saturated by the conventional method.

Figure 5:
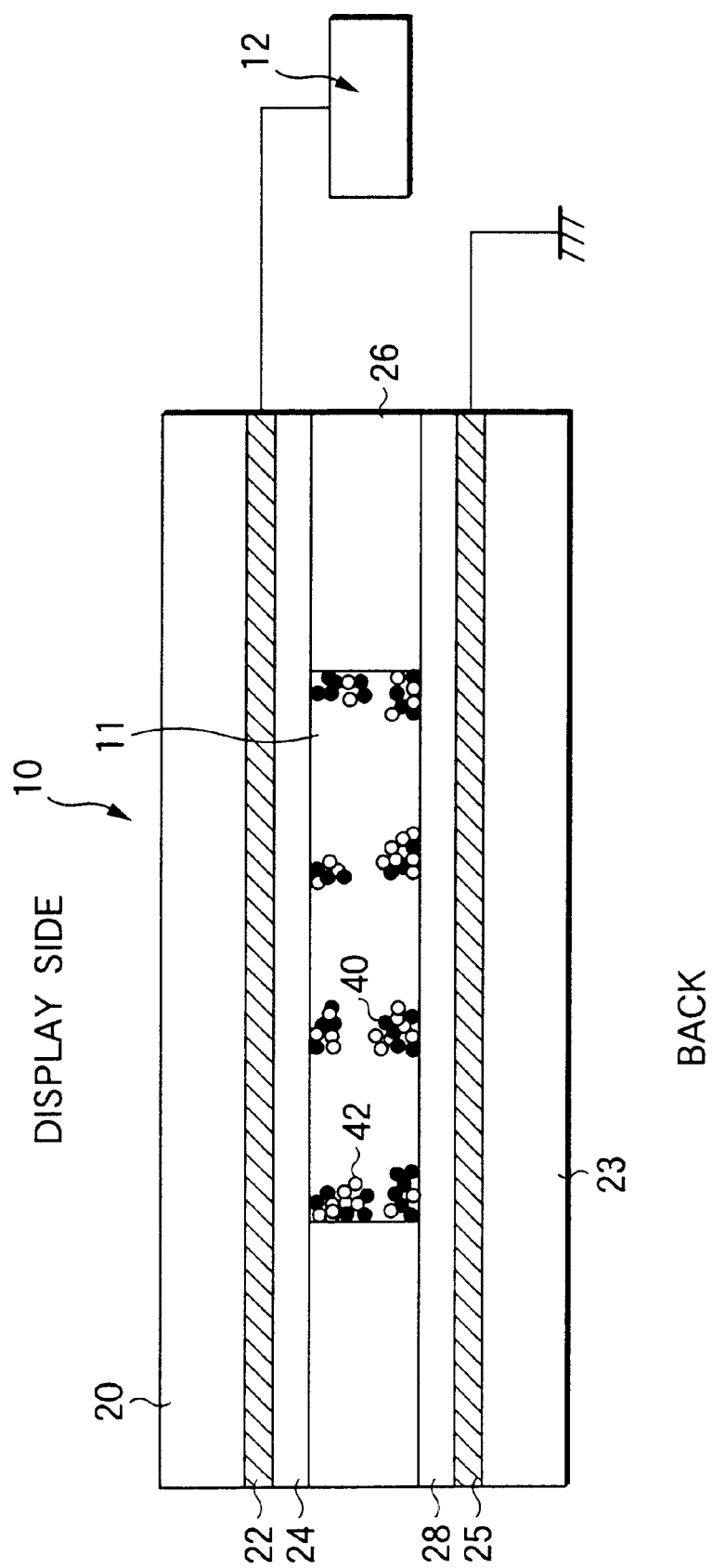
FIG. 5 shows agglomeration of the black and white particles in a unit cell in the image display part shown in FIG. 1.

When the applied voltage exceeds +/−450 V, the particles in an image display device according to this first preferred embodiment begin to agglomerate. For example, if a +/−500 V particle drive voltage pulse is applied for 20 msec repeatedly (at 25 Hz), for example, all particles will agglomerate into a number of clumps, and the unit cells will be apparently transparent. This condition is simulated in FIG. 5.

When this occurs, the particles cover approximately 10% of the display substrate surface area and cover approximately 10% of the back substrate surface area, and it is possible to see the inside of the back substrate from the display surface side.

Furthermore, if a +/−500 V particle drive voltage pulse is applied repeatedly so that the unit cells are apparently transparent, and a particle drive voltage pulse of approximately +/−350 V is then applied for 20 msec repeatedly (at 25 Hz), for example, the particle clumps will gradually break up and return to the uniform distribution that was present before particle agglomeration.

To confirm these results, a positive dc voltage is again applied to the display electrode 22 by the voltage control part 12 to confirm whether a white display can again be achieved with the white particles 42. The same good white display achieved before particle agglomeration is again confirmed. A negative dc voltage is also applied to the display electrode 22 to check whether a black display can again be achieved with the black particles 40. The same good black display achieved before particle agglomeration is again confirmed.

We thus confirm that particle agglomeration resulting from applying an overvoltage is reversible, and that the color display properties achieved by applying a normal voltage can be restored.

The voltage control part 12 in this first embodiment of the invention thus applies according to an externally input command a particle drive voltage pulse for moving white particles 42 to the display electrode 22 to display white, a particle drive voltage pulse for moving black particles 40 to the display electrode 22 to display black, and a particle drive voltage pulse to agglomerate the white particles 42 and black particles 40 and achieve an apparently transparent unit cell to produce a transparent display.

This first embodiment of the invention thus makes it possible to produce three different colors in one unit cell, that is, a good white display, black particles, and the color of the inside of the back substrate 23, and a multiple color display can be achieved without inviting a drop in resolution.

Embodiment 2

An image display device according to this second embodiment of the invention is an application of the image display device according to the first embodiment, and only the differences therebetween are described below.

The time needed to change the image display device according to the first embodiment to a white display, and the time needed to change to a black display, are substantially instantaneous, but the time required to agglomerate the particles to achieve a transparent display is 5 seconds when, for example, a +/−500 V particle drive voltage pulse is applied for 20 msec repeatedly at 25 Hz.

It is not desirable for the time needed to change the display to white, the time needed to change to black, and the time needed to change to a transparent display to be greatly different. This second embodiment of the invention resolves this by increasing the frequency of the particle drive voltage pulse applied repeatedly by the voltage control part 12 when agglomerating particles in the unit cells to make the display transparent.

Figure 6:
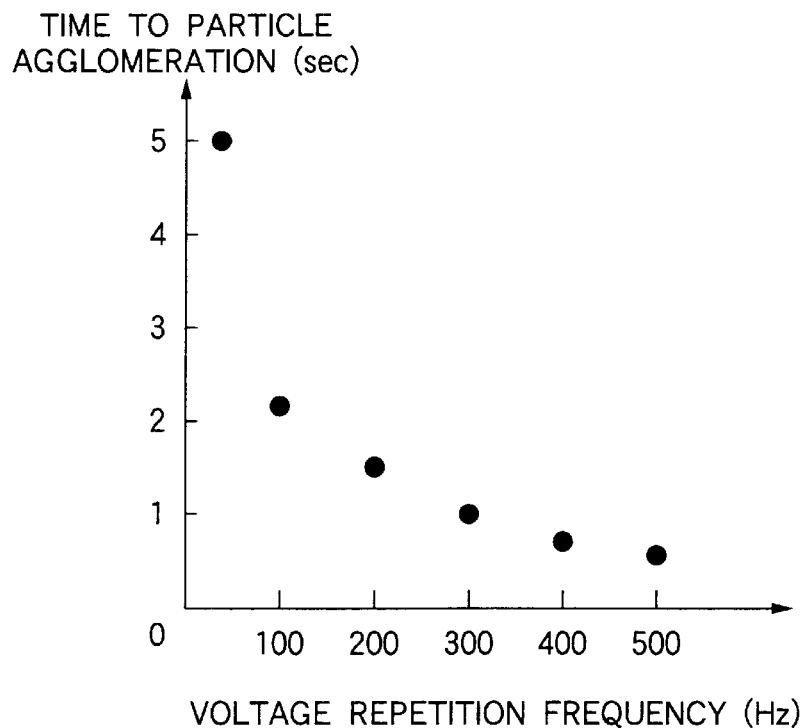
FIG. 6 is a graph showing the relationship between the repetition frequency of the particle drive voltage applied to the display electrode, and the time until black and white particle agglomeration inside the unit cell in response to the applied pulse.

As shown in FIG. 6, the time until the particles agglomerate becomes shorter as the frequency of the particle drive voltage pulse repeatedly applied by the voltage control part 12 increases at the time of changing to a transparent display. It should be noted that the particle drive voltage pulse is a +/−500 V rectangular pulse with a 50% duty ratio.

As will be obvious from FIG. 6, the time required for particles to clump sufficiently together is greatly reduced when the voltage control part 12 increases the frequency of the repeatedly applied particle drive voltage pulse, and the difference between white display response, black display response, and particle agglomeration response can be reduced.

Furthermore, the time required to disperse the clumped particles and restore the original uniform display (that is, the state in which the black particles 40 and white particles 42 are dispersed inside unit cells 11) is 3 seconds when, for example, a +/−350 V particle drive voltage pulse is applied for 20 msec repeatedly at 25 Hz. Note that this is longer than the time required to change to a white display and the time required to change to a black display.

In this second embodiment of the invention, the frequency of the particle drive voltage pulse repeatedly applied by the voltage control part 12 is increased to eliminate the difference between the time needed to change the display to white, the time needed to change to black, and the time needed to change from a transparent display to a uniform display.

Figure 7:
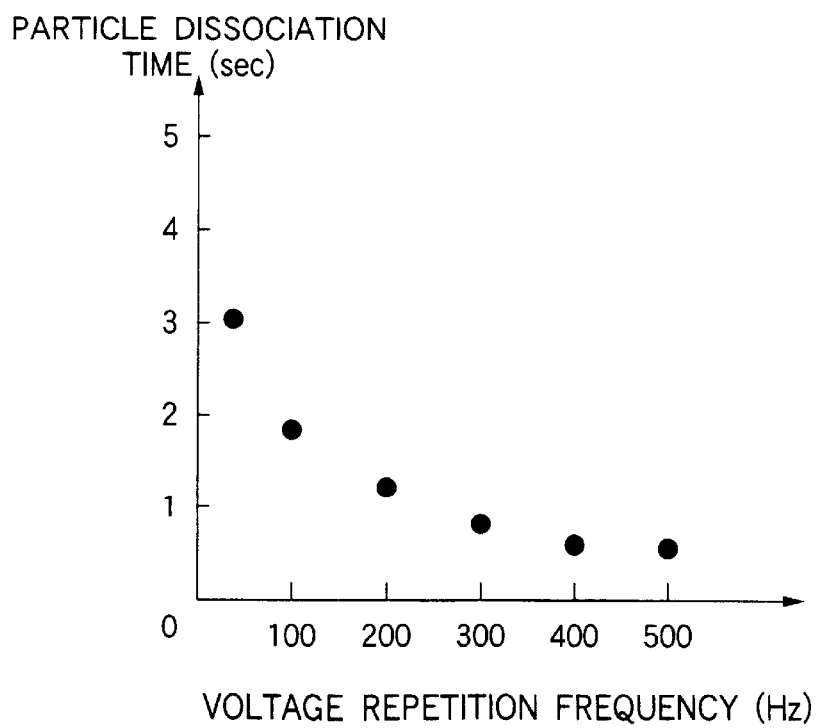
FIG. 7 is a graph showing the relationship between the repetition frequency of the particle drive voltage applied to the display electrode, and the time until dissociation of black and white particle clumps inside the unit cell in response to the applied pulse.

As shown in FIG. 7, the time required to disperse the particle agglomerations and redisperse the particles inside the unit cells 11 decreases as the frequency of the particle drive voltage pulse repeatedly applied by the voltage control part 12 increases. It will be remembered that this is the same as when clumping the particles. It should be noted that the particle drive voltage pulse is a +/−350 V rectangular pulse with a 50% duty ratio.

As will be obvious from FIG. 7, the time required to break up the particle clumps and redisperse the particles inside the unit cells 11 is greatly reduced when the voltage control part 12 increases the frequency of the repeatedly applied particle drive voltage pulse, and the difference between white display response, black display response, and particle separation response can be reduced.

It will be noted that the voltage, pulse shape, pulse time, and duty ratio of the particle drive voltage pulse are described by way of example only in the above embodiments, and these values must be selected appropriately according to the particles used, substrates, devices, application, and other considerations.

Embodiment 3

An image display device according to this third embodiment of the invention is an application of the image display device according to the first embodiment, and only the differences therebetween are described below.

Figure 8:
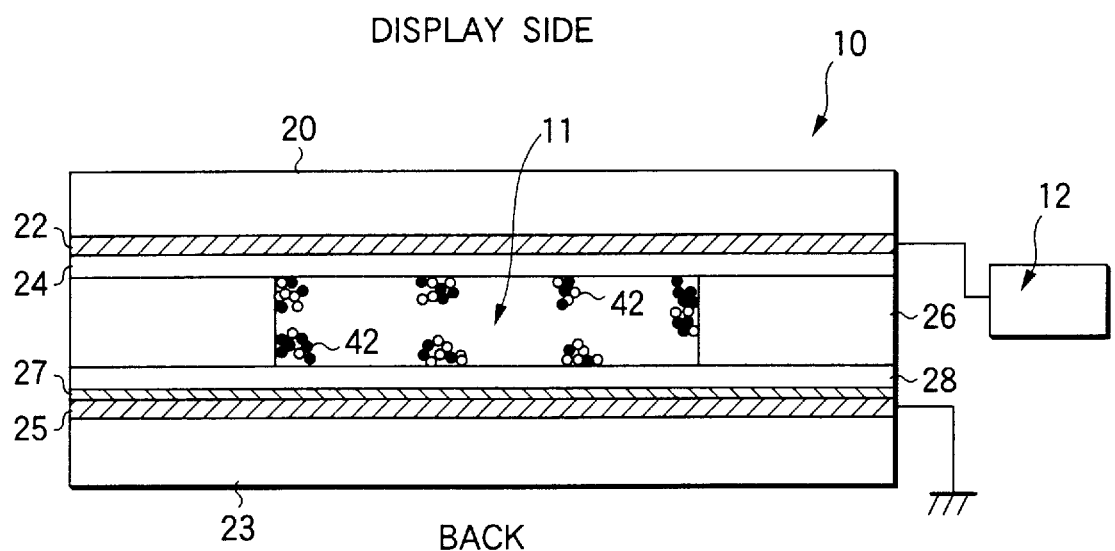
FIG. 8 is a schematic view showing the configuration of an image display device according to a third embodiment of this invention.

An image display device according to this third embodiment as shown in FIG. 8 has an approximately 5 $\mu$m thick yellow resin layer 27 disposed between the surface coating 28 and back electrode 25 formed on the surface of the back substrate 23 of image display part 10.

This resin layer 27 has a different color from either of the two types of particles filled into the unit cells 11. As described in the above first and second embodiments, when a particle drive voltage pulse is applied to agglomerate the two types of particles, the unit cells 11 become substantially transparent. As a result, the color of the resin layer 27 inside the unit cells 11, which is yellow in this embodiment, is reflected to the display surface area.

It should be noted that while the color of this resin layer 27 is yellow in this third embodiment of the invention, it can be magenta, cyan, or other color insofar as it is different in color to the particles sealed inside the corresponding unit cell. When the particles sealed into the unit cells are black and white as in the first embodiment, it is possible to display three different colors in one unit cell, that is, paper white, high density black, and the color reflected from resin layer 27.

It should be noted that if a magenta resin layer 27 is used, black, white, and magenta can be displayed. Likewise, if a cyan resin layer 27 is used, black, white, and cyan can be displayed.

It is therefore possible by means of this third embodiment of the invention to display three colors in each single unit cell, that is, black and white as a result of the two different particles, and yellow reflected from the back substrate 23.

Figure 9:
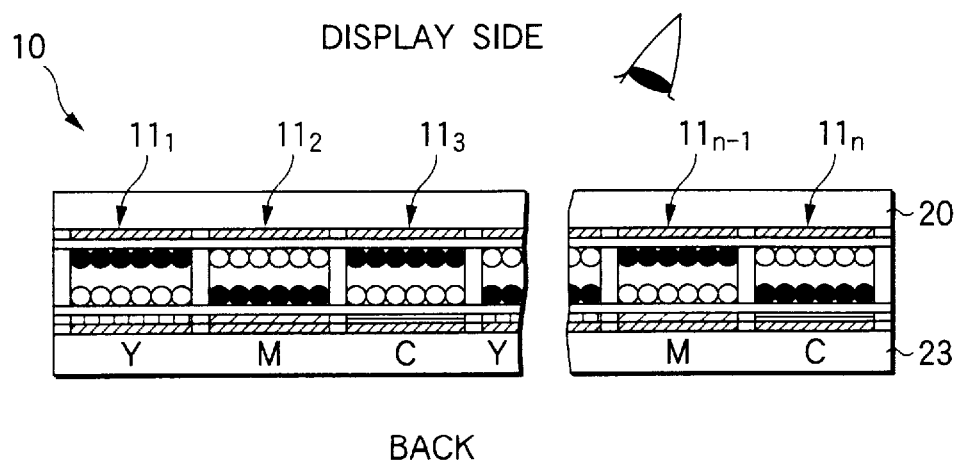
FIG. 9 is a schematic view of an alternative configuration of the image display device according to a third embodiment of this invention, and shows the configuration of an image display device in which plural unit cells $11_1$ to $11_n$ (where n is a positive integer) are formed between display substrate 20 and back substrate 23, and a color resin layer 27 is disposed to each unit cell.

As shown in FIG. 9, plural unit cells $11_1$ to $11_n$ (where n is a positive integer) are formed in rows between display substrate 20 and back substrate 23, and a yellow resin layer 27a, magenta resin layer 27b, and cyan resin layer 27c are formed in each unit cell. Note that while voltage control part 12 is not shown in FIG. 9, voltage control part 12 separately controls the voltage applied to the display electrode 22 disposed to each unit cell $11_1$ to $11_n$.

Figure 10:
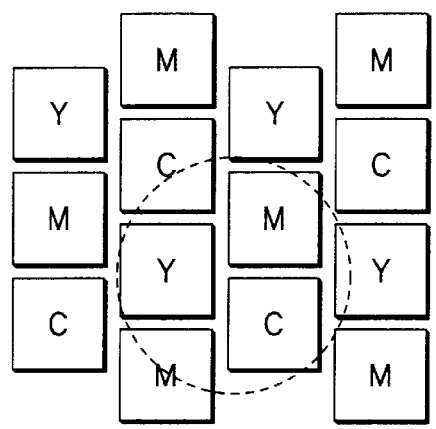
FIG. 10 is a top view showing an arrangement of colored unit cells.

A multiple color display can be achieved as shown in FIG. 10 so that these three color resin layers are arranged in regularly arrayed units of three colors each, or so that groups of three unit cells correspond to one pixel as indicated by the dotted line in FIG. 10. The resolution of a multiple color display in this latter case is ⅓ the unit cell count. However, a black and white display is used primarily for text images, and because one cell can constitute one pixel, resolution corresponding to the unit cell count can be achieved.

Furthermore, it is also possible to change color brightness by displaying the color of resin layer 27 in only one unit cell of the three cell unit used for color display, and appropriately driving the other two unit cells to display black or white to achieve the desired color brightness.

Figure 11:
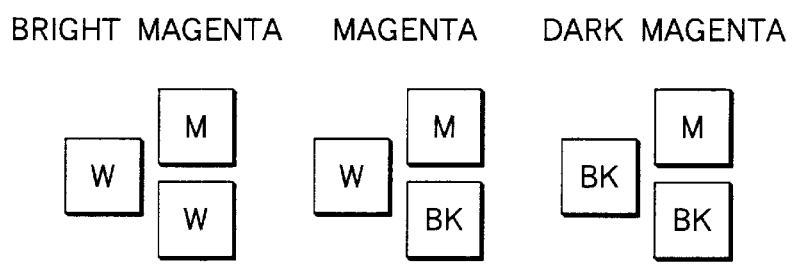
FIG. 11 is a top view showing an exemplary color display method.

This is further described with reference to FIG. 11. In this example a bright magenta display can be achieved by gathering the particles of a unit cell having a magenta resin layer 27b to the outside electrode 30b to display magenta, and driving the other two unit cells to display white. A dark magenta display can be achieved by driving these other two unit cells to display black. A normal magenta reflecting the color of the magenta resin layer 27b can be produced by driving one of these other two unit cells to display white and driving the other one to display black.

Magenta and cyan particles could also be used in place of black and white particles, while using a yellow resin layer 27a on the inside surface of the back substrate. In this case, a three color YMC (that is, the three primary colors) display can be achieved in each individual pixel. Other variations will also be obviously possible, including using yellow and magenta particles with a cyan resin layer 27c, or yellow and cyan particles with a magenta resin layer 27b. It will thus be obvious that the combination of colors can be freely changed.

It will also be obvious that the colors used shall not be limited to YMC (three primary colors), and can be changed as appropriate to the application. For example, in an image display part 10 comprising an array of plural unit cells fill with black and white particles, a multiple color display can be achieved using a regular arrangement of cells corresponding to the three primary colors of light, that is, unit cells having a red resin layer 27, unit cells having a green resin layer 27, and unit cells having a blue resin layer 27.

The three primary colors of light (RGB) can also be displayed in a single pixel by using, for example, red and blue particles with a green resin layer on the inside surface of the back substrate instead of using black and white particles.

It will also be obvious that other combinations of color particles can be used as necessary with the color of the resin layer on the inside surface of the back substrate 23 determined so that the desired colors can be displayed.

The resin layer 27 can be made by dispersing pigment or dye of the desired color in polycarbonate, polyethylene, polystyrene, vinyl, or other appropriate resin. The above effects can also be achieved by dispersing pigment or dye of the desired color in the surface coating 28 rather than additionally providing a resin layer 27.

Furthermore, color particles of yellow, magenta, cyan, or other color can be achieved by dispersing a common magenta, yellow, cyan, or other color of dye or pigment in a transparent polyester, polystyrene, polymethyl methacrylate, or other appropriate resin. It should be noted that titanium oxide, silicon oxide, or other charge control agent is preferably added to stabilize the particle charge characteristics.

Embodiment 4

An image display device according to this fourth embodiment of the invention is an application of the image display device according to the first embodiment, and only the differences therebetween are described below.

Figure 12:
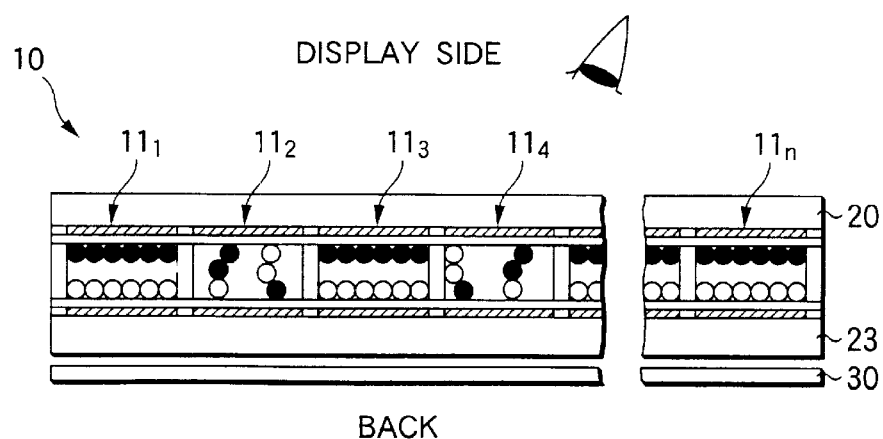
FIG. 12 is a schematic view of an image display device according to a fourth embodiment of this invention.

As shown in FIG. 12, the display substrate 20 and back substrate 23 of the image display part 10 are both transparent in this fourth embodiment of an image display device according to the present invention, and plural unit cells are arranged between the display substrate 20 and back substrate 23. Note that while voltage control part 12 is not shown in FIG. 12, voltage control part 12 separately controls the voltage applied to the display electrode 22 disposed to each unit cell $11_1$ to $11_n$.

Like display substrate 20, back substrate 23 in this embodiment is made from an ITO glass substrate with a transparent surface coating 28 formed by coating the inside surface contacting the particles with a 5 μm thick transparent polycarbonate resin.

A panel member 30 having a specific image written thereon is further disposed to the back side of back substrate 23.

An image display device thus comprised can be driven to display black by applying a −350 V dc voltage to specific unit cells in the group of plural unit cells $11_1$ to $11_n$ (for example, $11_1$, $11_3$, and $11_n$ in FIG. 12) so that the black particles 40 move to the display substrate 20 as a result of the field produced in unit cells $11_1$, $11_3$, and $11_n$, and the white particles 42 are electrostatically pulled to the back substrate 23.

It is therefore possible to make part of the image on the panel member 30 disposed behind the back substrate 23 visible from the display substrate side by applying an approximately +/−500 V particle drive voltage pulse to particular unit cells ($11_2$ and $11_4$ in FIG. 12) selected from the plural unit cells $11_1$ to $11_n$ repeatedly for 20 msec, for example, thereby making the unit cells apparently transparent. This means new image display methods can be achieved by selectively showing or hiding an object or image such as placed on the panel member 30 disposed behind the image display part 10.

It should be noted that while not shown in FIG. 12, if a +350 V dc voltage is applied to particular unit cells in the plural unit cells $11_1$ to $11_n$, the field produced in the unit cells causes the white particles 42 to move to the display substrate 20, electrostatically pulls the black particles 40 to the back substrate 23, and produces a white display.

It is therefore possible by means of this fourth embodiment of the invention to produce three types of displays, that is, an image display achieved with a combination of black cells and transparent cells, an image display achieved with a combination of white cells and transparent cells, and an image display achieved with a combination of black cells, white cells, and transparent cells.

Embodiment 5

Figure 13:
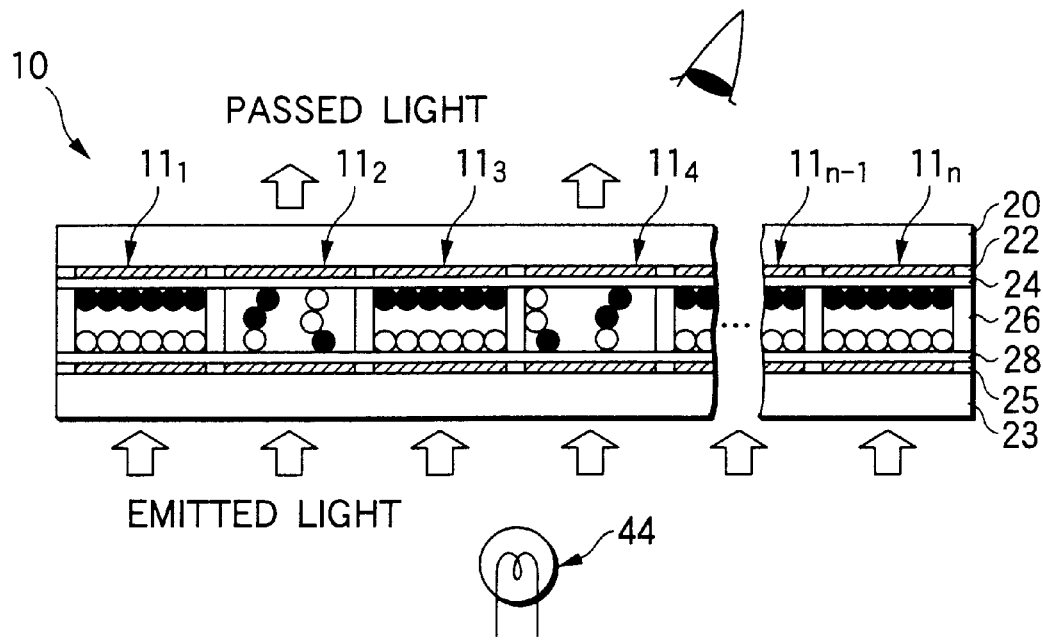
FIG. 13 is a schematic view of an image display device according to a fifth embodiment of this invention.

An image display device according to a fifth embodiment of the present invention has, as shown in FIG. 13, a light source 44 disposed behind the back substrate 23 of image display part 10 in place of panel member 30 as described in the fourth embodiment above. Note that while voltage control part 12 is not shown in FIG. 13, voltage control part 12 separately controls the voltage applied to the display electrode 22 disposed to each unit cell $11_1$ to $11_n$.

An image display device according to this fifth embodiment thus displays an image using the unit cells driven to display black (cells $11_1$, $11_3$, $11_{n-1}$, $11_n$ in FIG. 13), and light from light source 44 passing the transparent cells ($11_2$ and $11_4$ in FIG. 13) driven to agglomerate the particles in the cell so that the image or pattern behind the back substrate 23 shows through. Thus, both of the unit cells;

The unit cells display black and the unit cells pass the light from light source 44 make black and white display with very high contrast.

This configuration makes it possible to selectively drive unit cells so that they pass light. It is therefore possible to use a novel image display method such as described in the fourth embodiment. More specifically, it is possible to show or not show desired parts of an object or panel member 30 having a particular image formed thereon and disposed between the light source 44 of the image display part 10 [and the viewer].

It will be noted that while an image with the highest contrast can be displayed by using a light source 44 that emits white light, the backlight color shall not be limited to white light in this invention, orange, green or any other desired color of light can be used. Images can also be displayed in this case using the contrast between the backlight color and the particle colors in the unit cells.

It will also be obvious that various types of light sources can be used for light source 44, including fluorescent lights, incandescent, and LEDs.

It should be further noted that light passes efficiently through those parts where the unit cells are made transparent, but light from the light source 44 does not pass those parts where the unit cells display black and white because of the high opacity (low transmittance) of the particles. It is therefore possible to use backlighting and achieve a display comparable to that of a light-emitting display.

This means that, for example, a reflection display method using the white particles 42 and black particles 40 in the unit cells can be used during the day and in bright surroundings by turning the light source 44 off with a switch (an illuminator), for example. At night and in dark surroundings, the light source 44 can be turned on to use a light transmitting display method using light from the light source 44 and particles driven to selectively block the passage of light from light source 44.

It is therefore possible to provide a display with excellent viewability under all lighting conditions.

Embodiment 6

Figure 14:
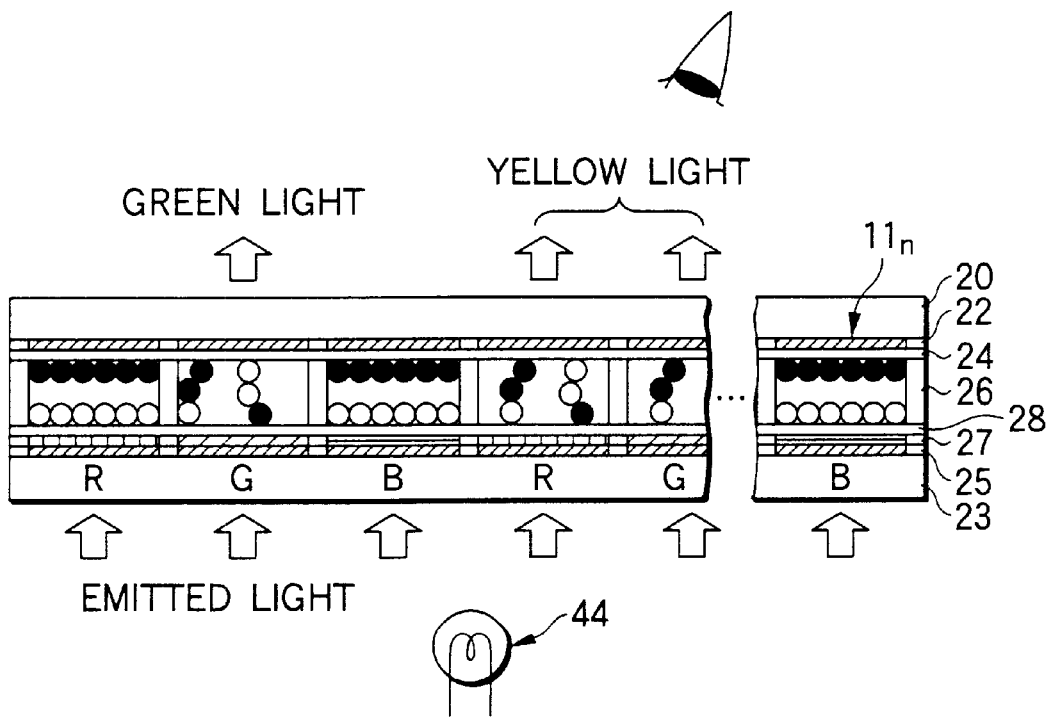
FIG. 14 is a schematic view of an image display device according to a sixth embodiment of this invention.

A sixth embodiment of an image display device according to the present invention is shown in FIG. 14. This image display device is an application of the above described third and fifth embodiments. That is, similarly to the third embodiment, an image display device according to this preferred embodiment of the invention has an RGB color filter disposed as the desirably colored resin layer 27 between the surface coating 28 and back electrode 25 formed on the surface of back substrate 23 of the image display part 10. Furthermore, similarly to the fifth embodiment, a light source 44 is disposed behind the back substrate 23 of image display part 10.

In addition to the black and white displays that can be achieved with two types of particles as described in the third embodiment, an image display device according to this sixth embodiment can display the color of the color filter formed on back substrate 23. Light can also be emitted from the back of the back substrate 23 while making selected parts of the image display part 10 transparent according to color image information to display a desired filter color as in the fifth embodiment, thereby achieving a backlit color display.

Referring to FIG. 14, color filter power (red, green, blue) is provided in a regular pattern for each color in each cell of the image display part 10. A halogen lamp is used for light source 44 to provide uniform illumination to from the back of back substrate 23. Green, for example, can thus be displayed by turning the unit cell where the green filter is located transparent so that green light is emitted. A combination of unit cells can also be made transparent to combine colors. Fore example, yellow can be displayed by making unit cells where red and green filters are disposed transparent so that both red and green light is emitted and combined.

Embodiment 7

Figure 15A:
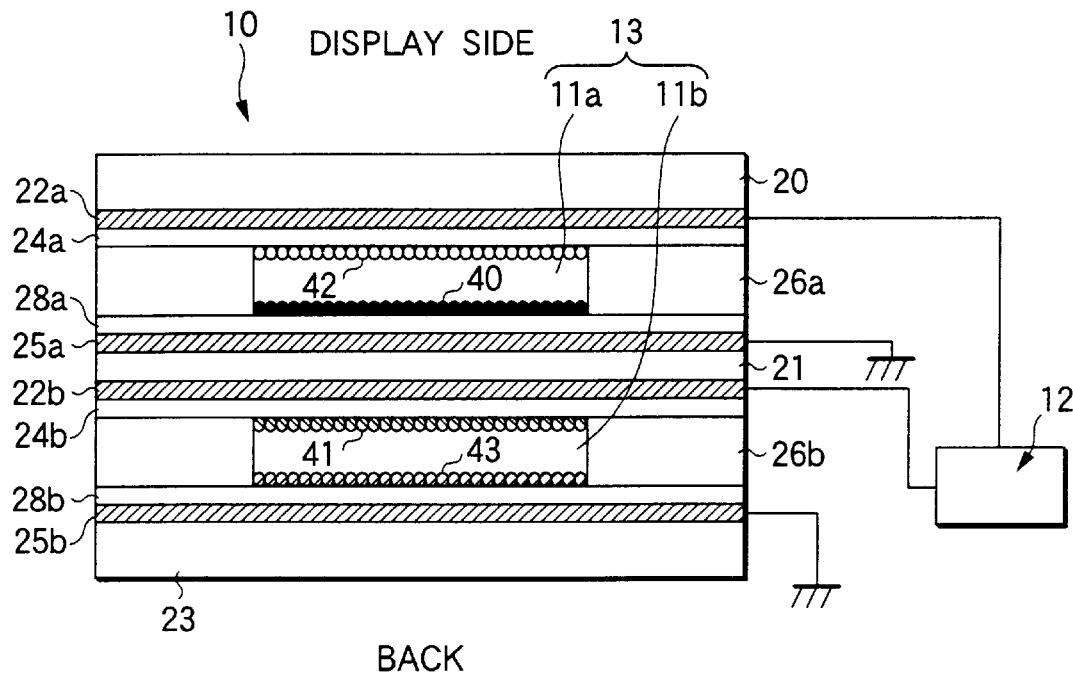
FIGS. 15A and 15B are schematic views of an image display device according to a seventh embodiment of this invention, respectively showing a color display using a first unit cell disposed on the upper layer side, and a color display using a second unit cell disposed on the lower layer side.
Figure 15B:
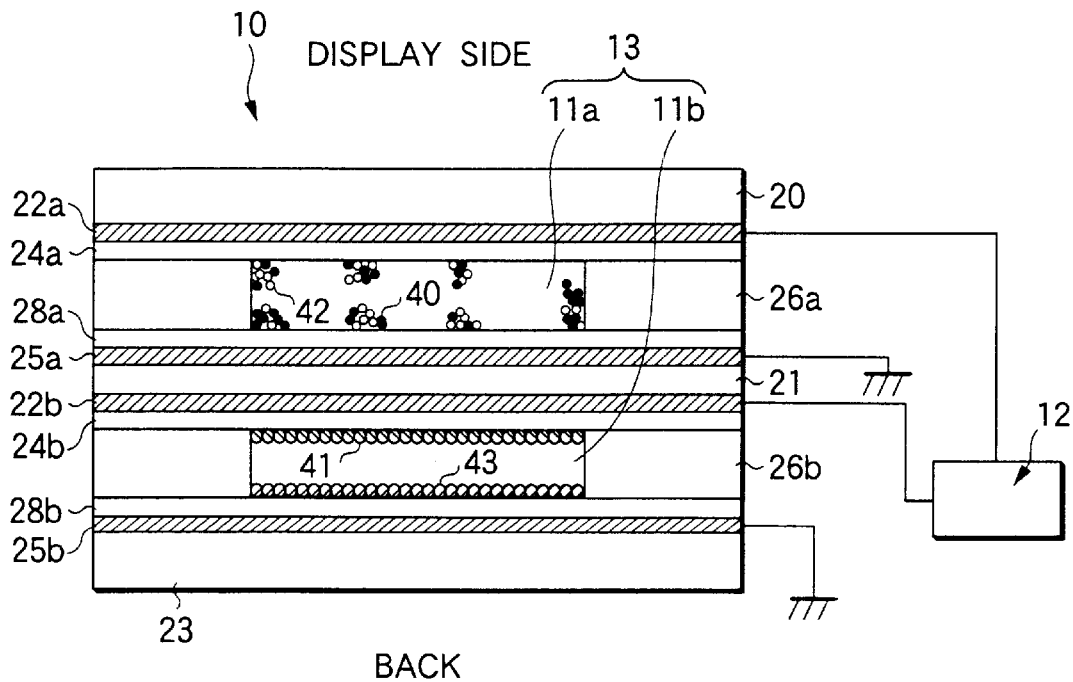

An image display device according to this seventh embodiment of the present invention is an application of the first embodiment. As shown in FIG. 15A and FIG. 15B, two unit cells 11a and 11b are stacked together to form one display cell 13.

Between the back substrate 23 and the transparent display substrate 20 forming the image display surface of the image display device, an image display part 10 used in this seventh embodiment of the invention has disposed a transparent first display electrode 22a on which transparent surface coating 24a is formed; first spacer 26a; transparent first back electrode 25a on which transparent surface coating 28a is formed; transparent middle substrate 21; transparent second display electrode 22b on which a transparent surface coating 24b is formed; a second spacer 26b; and a transparent second back electrode 25b on which transparent surface coating 28b is formed.

As in the first embodiment, black particles 40 and white particles 42 are sealed inside the first unit cells 11a delimited by the first spacer 26a. In addition, color particles 41, 43 of two types different from the particles sealed inside first unit cells 11a are sealed in the second unit cells 11b delimited by the second spacer.

Any two colors of particles made from a transparent polyester, polystyrene, polymethyl methacrylate, or other appropriate resin containing a common magenta, yellow, cyan, red, green, blue or other color of pigment or dye can be used for the two types of color particles 41, 43. It will also be obvious that other colors of particles can be used as needed. Titanium oxide, silicon oxide, or other charge control agent is preferably added to stabilize the particle charge characteristics.

Note, further, that the first color particles 41 are positively charged color particle, and the second color particles 43 are the negatively charged color particles in this seventh embodiment.

When, for example, a +350 V positive dc voltage is equally applied to the first display electrode 22a in this seventh embodiment, the negatively charged white particles 42 move to the display substrate 20 side and the positively charged black particles 40 are electrostatically pulled to the back substrate 23 side as shown in FIG. 15A. Only the white particles 42 thus adhere evenly to the display substrate 20, and a good white display (reflection density $\leq 0.3$) is achieved.

When a −350 V negative dc voltage is equally applied to the first display electrode 22a, the positively charged black particles 40 move to the display substrate 20 side and the negatively charged white particles 42 are electrostatically pulled to the back substrate 23 side. Only the black particles 40 thus adhere evenly to the display substrate 20, and a good black display (reflection density $\geq 1.5$) is achieved.

The color of the particles in the first unit cells 11a is shown at the display substrate regardless of the state of the particles in the second unit cells 11b. It is therefore not necessary to apply voltage to inside electrode 30a and outside electrode 30b of the second back electrode 25a.

Furthermore, if a +/−500 V particle drive voltage pulse is applied repeatedly to the first display electrode 22a, the particles inside the first unit cells 11a will agglomerate as shown in FIG. 15B so that the first unit cells 11a become apparently transparent. As a result, the color of the second unit cells 11b disposed in a layer below the first unit cells 11a is displayed.

If a −350 V negative dc voltage, for example, is then applied equally to the second display electrode 22a, the first color particles 41 move to the display substrate 20 side and the negatively charged second color particles 43 are pulled electrostatically to the back substrate 23 side. Only the first color particles 41 thus adhere evenly to the display substrate 20 and the color of the first color particles 41 is displayed.

On the other hand, if a +350 V positive dc voltage is applied equally to the first display electrode 22a, the negatively charged second color particles 43 move to the display substrate 20 side and the positively charged first color particles 41 are pulled electrostatically to the back substrate 23 side. Only the second color particles 43 thus adhere evenly to the display substrate 20 and the color of the second color particles 43 is displayed.

It is therefore possible with the image display device of the seventh embodiment to produce a color display using the two different particles in the first unit cells, and another color display using the two different particles in the second unit cells to display a total of four colors in one stacked cell formed by stacking a first unit cell and a second unit cell together. A high resolution multiple color display with even richer display capabilities can thus be provided.

Figure 16A:
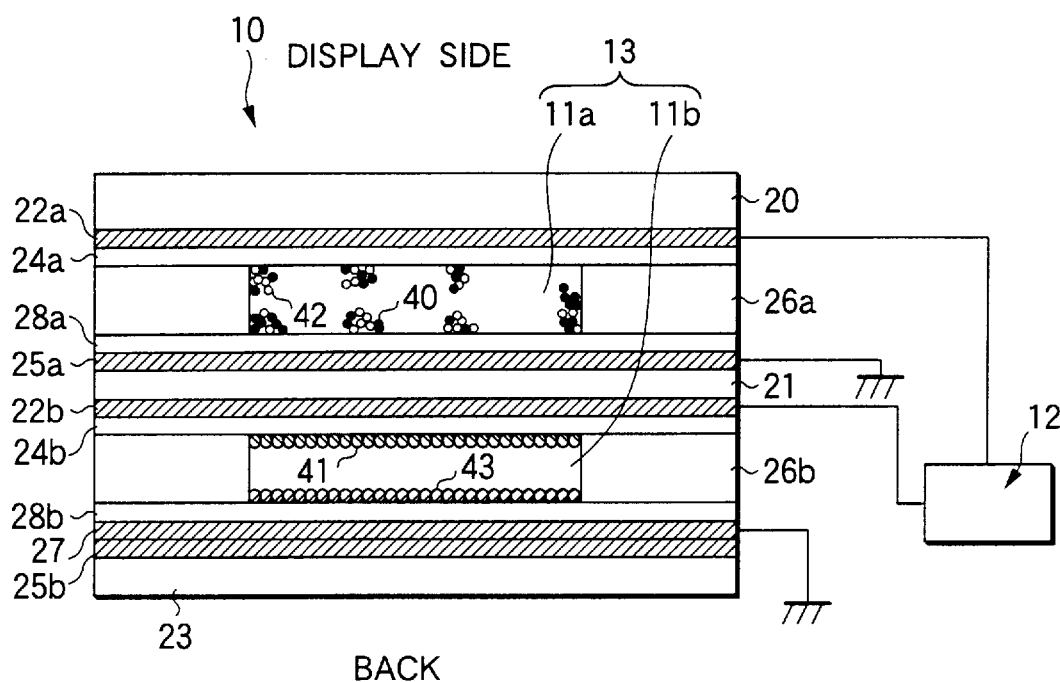
FIGS. 16A and 16B are schematic views of an image display device according to the seventh embodiment having a color resin layer 27 disposed between the second back electrode 25b and surface coating 28b, respectively showing a color display using a second unit cell disposed on the lower layer side, and a color display displaying the color of the resin layer 27.
Figure 16B:
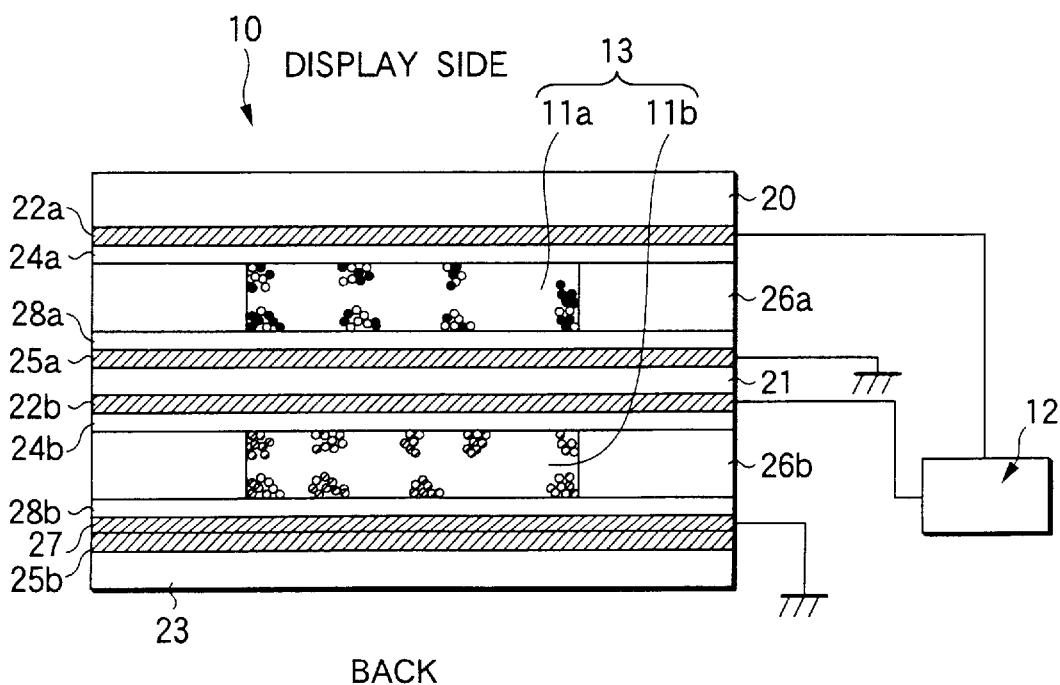

It is also possible, as shown in FIG. 16A and FIG. 16B to dispose a color resin layer 27 between the second back electrode 25b and surface coating 28b. In the display area corresponding to one stacked cell, a color display using the two different particles in the first unit cells, another color display using the two different particles in the second unit cells, and a color display using the color of the resin layer 27 as shown in FIG. 16B, can be combined to produce a five color display. A multiple color display with an even richer variety of expression can therefore also be provided.

The colors of the two types of particles in the first unit cells, the two types of particles in the second unit cells, and the resin layer 27 are not specifically limited, but the colors of the two types of particles in the first unit cells, the two types of particles in the second unit cells, and the resin layer 27 are preferably different colors. For example, the two types of particles in the first unit cells could be black and white while the colors of the two types of particles in the second unit cell and the color of resin layer 27 are yellow, magenta, and cyan (the three primary colors of solids) or red, green and blue (the three primary colors of light). When thus comprised, a high resolution, full color display can be achieved.

Similarly to the image display device of the above fourth embodiment, the display substrate 20 and back substrate 23 of the image display part 10 can both be transparent while forming plural display cells $13_1$ to $13_m$ (where m is a positive integer) between the display substrate 20 and back substrate 23. This makes it possible to produce a rich, full color display while also making it possible to see a pattern behind the back substrate 23 from the display substrate 20 side.

This configuration makes it possible to produce a four color display using the two particles types in the first unit cells and the two particle types in the second unit cell, and a five color display by additionally disposing a color resin layer 27. In addition, a novel image display method whereby the unit cells are driven to partially hide or show selected parts of an object or image located behind the image display part 10 can additionally be achieved.

Figure 17:
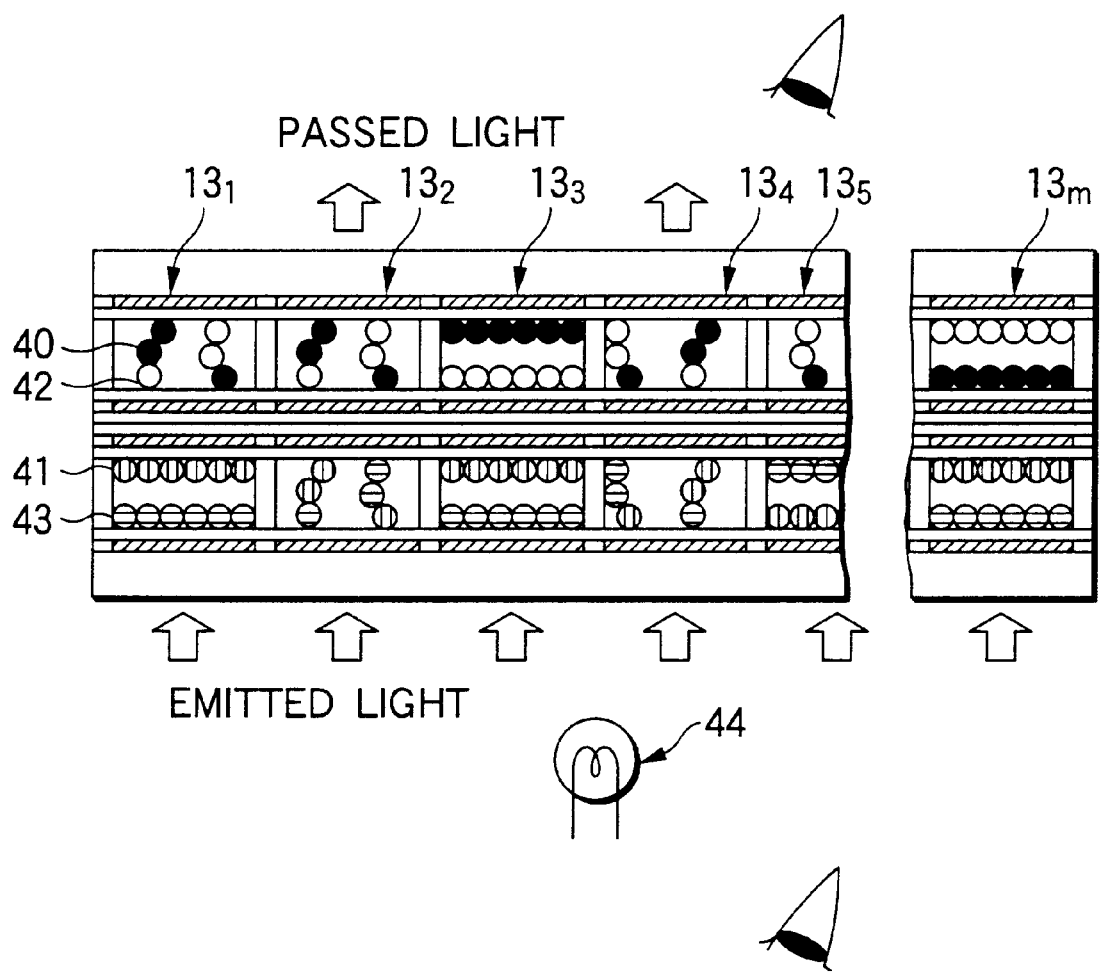
FIG. 17 is a schematic view of a further variation of an image display device according to the seventh embodiment in which all substrates of the image display device are transparent, and a light emitting unit is further disposed on the back side.

As shown in FIG. 17, it is additionally possible for the display substrate 20 and back substrate 23 of the image display part 10 to both be transparent while forming plural display cells $13_1$ to $13_m$ (where m is a positive integer) between the display substrate 20 and back substrate 23 and, further, locating a light source 44 behind the back substrate 23. In addition to providing a rich full color display, it is also possible with this configuration to make selective display cells 13 transparent so as to pass light emitted from the light source 44 to the display surface side, thereby achieving a high contrast, high resolution, multiple color display.

With an image display device thus comprised voltage could be applied so that, for example, the black particles 40 and white particles 42 in the first unit cell of first display cell $13_1$ agglomerate and the first unit cells become transparent, and the first color particles 41 sealed inside the second unit cell adhere to the second display substrate. The color of the first color particles 41 will thus be displayed in the first display cell $13_1$.

In addition, the black particles 40 and white particles 42 in the first unit cell of second display cell $13_2$, and the first color particles 41 and second color particles 43 in the second unit cell respectively agglomerate, and the cells become transparent. In this case light from the light source 44 behind the back substrate 23 is emitted from the second display cell $13_2$.

Voltage is also applied in the third display cell $13_3$ so that the black particles 40 in the first unit cell adhere to the first display substrate. The color of the black particles 40 is thus displayed in this third display cell $13_3$.

Figure 18:
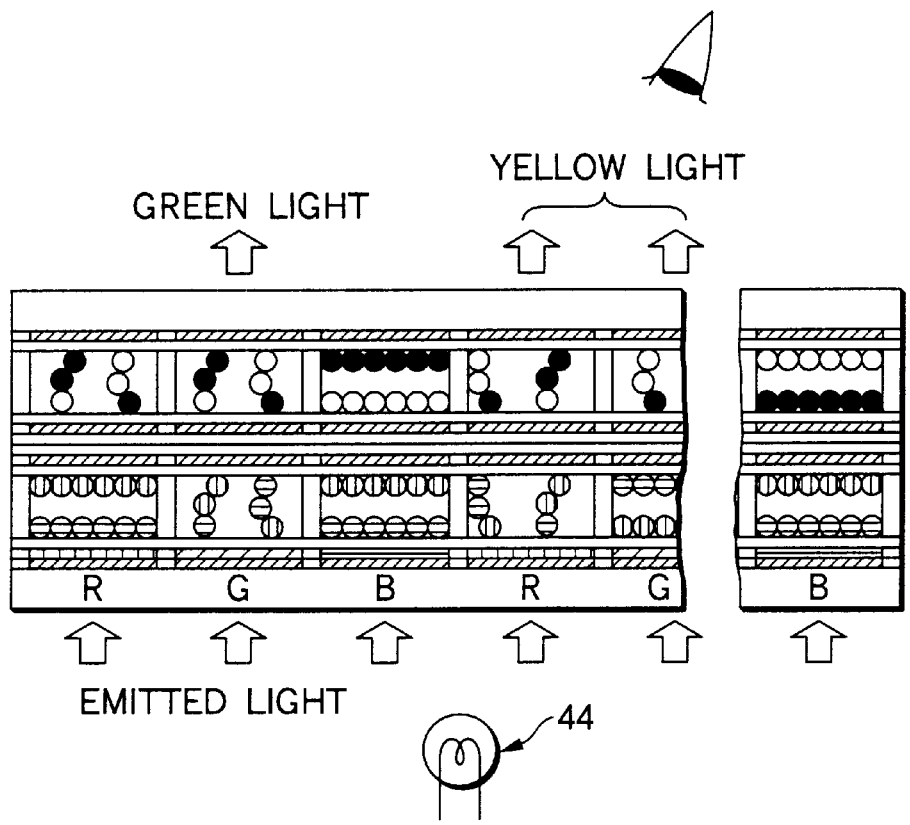
FIG. 18 is a schematic view of a further variation wherein a color resin layer is disposed as a color filter for each display cell 13 of the image display device shown in FIG. 17.
Figure 19:
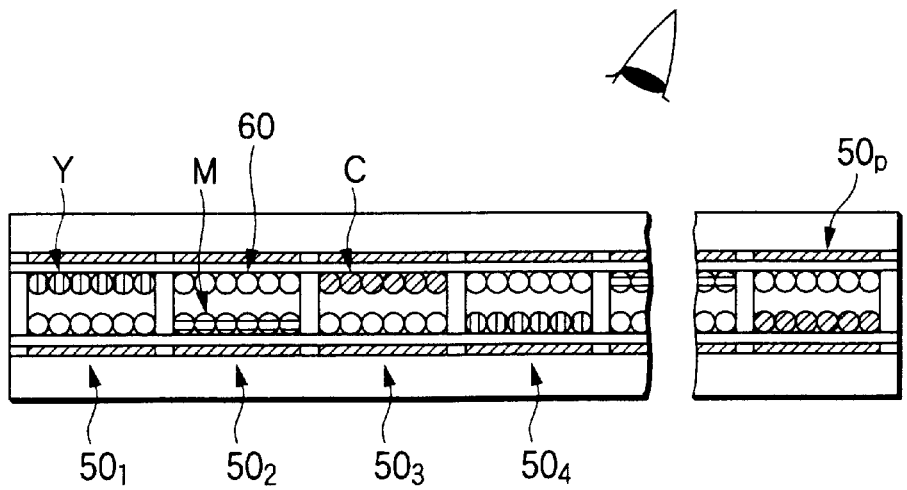
FIG. 19 is a schematic view of a conventional particle type image display device.
Figure 20:
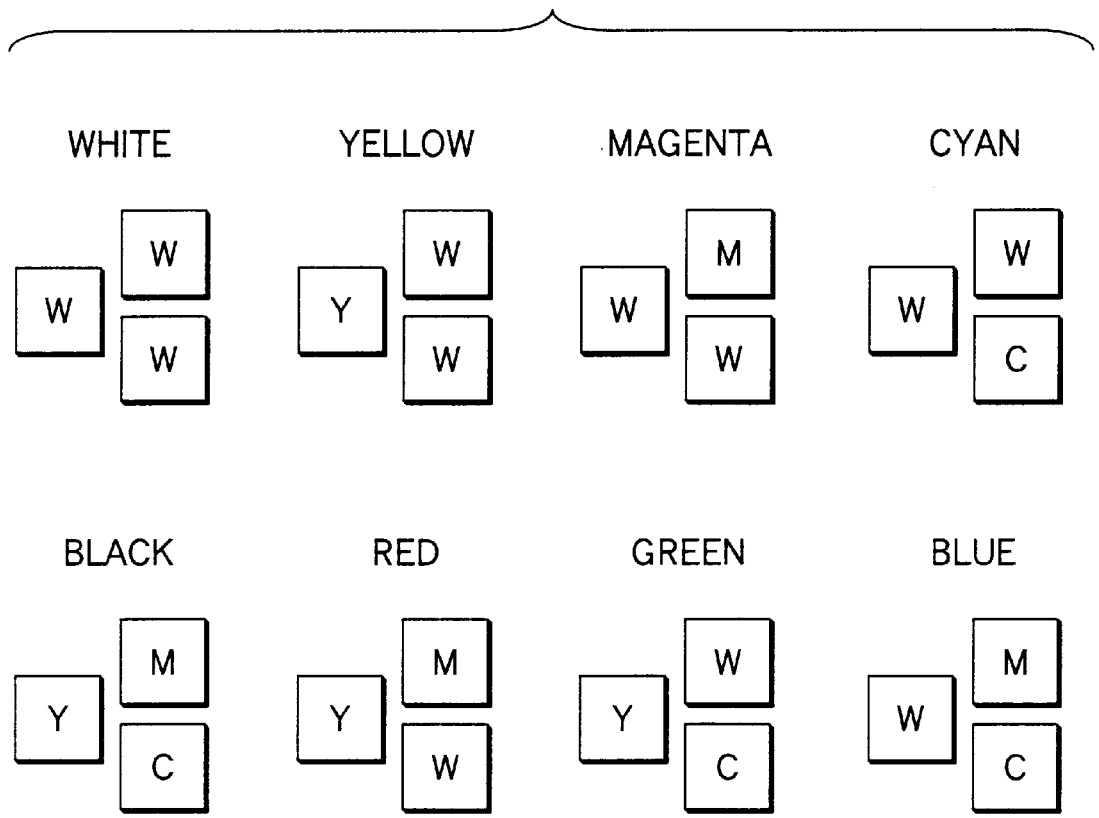
FIG. 20 shows a color display method using three types of unit cells.

A further variation is shown in FIG. 18. In this case a color resin layer 27 is disposed between the second back electrode 25b and surface coating 28b in each display cell 13 of the image display parts $13_1$ to $13_m$ formed by arraying plural display cells 13 between display substrate 20 and back substrate 23, and a light source 44 is disposed behind back substrate 23. The color resin layer 27 further preferably has a regular arrangement of red, green, and blue areas forming RGB color filters, and the resin layer 27 is disposed so that an RGB color filter is positioned at each stacked cell unit.

As described in the fifth embodiment above, it is therefore possible to use a reflection display method using the white particles 42 and black particles 40 in the unit cells during the day and in bright surroundings, for example, by turning the light source 44 off. At night and in dark surroundings, the light source 44 can be turned on to use a light transmitting display method using light from the light source 44 and particles driven to selectively block the passage of light from light source 44.

It is therefore possible to provide a display with excellent viewability under all lighting conditions.

It will be obvious that while the above embodiments have been described using one voltage control part 12 to independently control the voltage applied to each electrode, a separate voltage control part 12 can be disposed to each electrode to independently and separately control the applied voltage.

Furthermore, an embodiment stacking unit cells in first and second layers to form one display cell is described above. It will also be obvious to one with ordinary skill in the related art that the invention shall not be so limited, and the unit cells could be stacked in three or more layers to form one display cell.

It should be further noted that the numeric values used in the preceding descriptions of preferred embodiments are used by way of example only, and that the actual values will be selected appropriately according to the volume of the unit cells, the materials of the various parts, and the particle materials. The waveform and pulse time of the particle drive voltage pulse in the above embodiments are also used by way of example only, and will also be selected appropriately according to the particles, substrates, device, and application.

As described above, the present invention makes it possible to produce a multiple color display without inviting a drop in resolution or with a suppressed drop in resolution.

This invention also makes it possible to produce a high quality multiple color display.

Yet further, this invention makes it possible to use a backlight display method whereby illumination is provided from the back of the display.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No. 2000-287785 filed on Sep. 21, 2000 including specification, claims, drawings and abstract is incorporated herein by reference in its entirety.

What is claimed is:

1. A driving method for an image display medium, the image display medium having a plurality of facing substrates of which at least a display-side substrate is transparent, a unit cell delimited between the substrates, and at least two types of particle groups of different color and charge characteristics sealed inside the unit cells, the driving method comprising the steps of:

producing a color display by applying a particle drive voltage pulse of a saturation voltage, the saturation voltage being high enough to saturate the color density of the at least one particle group of the at least two particle group types that moves to the display-side substrate as a result of a field produced by applying voltage to a unit cell; and producing a transparent display by applying a particle drive voltage pulse of an absolute voltage greater than the saturation voltage so that the two particle group types inside the unit cells agglomerate and make the unit cell transparent.

2. The image display medium driving method as described in claim 1, wherein to produce the transparent display, a particle drive voltage pulse of a frequency higher than the frequency of the saturation voltage particle drive voltage pulse is applied.

3. The image display medium driving method as described in claim 1, wherein to cancel the transparent display, a particle drive voltage pulse of a voltage lower than the voltage causing particle groups to agglomerate, and a frequency higher than the frequency of the saturation voltage particle drive voltage pulse, is applied.

4. A driving method for an image display medium, the image display medium having a transparent display substrate, a back substrate disposed opposite the display substrate with a gap therebetween, and two types of particles of different color and charge characteristics sealed between the substrates so that particles can move between the substrates when a field is applied therebetween, wherein the color particles are driven by means of at least two particle drive voltage pulses, including:

a first particle drive voltage pulse for producing a color display by applying a saturation voltage causing particles of at least one color to adhere to the display substrate, the saturation voltage being high enough so that the color density of particles of the one color of the at least two particle types is saturated; and a second particle drive voltage pulse for producing a transparent display by causing particles to agglomerate.

5. The image display medium driving method as described in claim 4, wherein to produce the transparent display, a particle drive voltage pulse of a frequency higher than the frequency of the saturation voltage particle drive voltage pulse is applied.

6. The image display medium driving method as described in claim 4, wherein to cancel the transparent display, a particle drive voltage pulse of a voltage lower than the voltage causing particle groups to agglomerate, and a frequency higher than the frequency of the saturation voltage particle drive voltage pulse, is applied.

7. An image display device comprising:

a plurality of facing substrates of which at least a display-side substrate is transparent;

a support member disposed between each of the plural substrates and delimiting a unit cell;

particle groups of at least two types sealed in the unit cell, having different color and charge characteristics, and moving in mutually opposite directions between the substrates in response to an applied field;

a pair of electrodes disposed between the plurality of facing substrates to form a field in the unit cell; and display control means for displaying the color of at least one of the particle groups by applying a particle drive voltage pulse of a saturation voltage, the saturation voltage being high enough so that the color of the at least one particle group of the at least two particle groups that moves to the display side substrate due to the applied field reaches a saturation density, and producing a transparent display by applying a particle drive voltage pulse of an absolute voltage greater than the saturation voltage so that the two particle group types inside the unit cells agglomerate and make the unit cell transparent.

8. The image display device as described in claim 7, wherein the display control means applies a particle drive voltage pulse of a frequency higher than the frequency of the saturation voltage particle drive voltage pulse when producing the transparent display.

9. The image display device as described in claim 7, wherein the display control means applies a particle drive voltage pulse of a voltage lower than the voltage causing particle groups to agglomerate, and a frequency higher than the frequency of the saturation voltage particle drive voltage pulse, to cancel the transparent display.

10. The image display device as described in claim 7, wherein the color of one substrate of a facing pair of substrates in the plural substrates is different from the color of either of the at least two types of particle groups.

11. The image display device as described in claim 7, wherein a plurality of said unit cells are disposed between said facing plural substrates, a filter of a specific color is disposed to each unit cell, and the plural unit cells having different color filters are driven as a single pixel unit to produce a color display.

12. The image display device as described in claim 7, comprising unit cells having at least two types of particle groups sealed therein disposed between three or more parallel substrates having gaps therebetween, wherein stacked unit cells in upper and lower layers form one display cell, and the colors of the at least two types of particles sealed in each of the stacked unit cells are all different.

13. The image display device as described in claim 7, further comprising a color filter disposed to the lowest layer substrate in the display cell, wherein the color of particles sealed in the unit cell on the upper layer, the color of particles sealed in the unit cell on the lower layer, and the color of the color filter are all different.

14. The image display device as described in claim 7, wherein all substrates are transparent, and light emitting means for emitting light toward the display-side substrate from back-side substrate is further disposed behind the back substrate.

* * * * *